(12) United States Patent
Yamashita et al.

(10) Patent No.: US 12,509,132 B2
(45) Date of Patent: Dec. 30, 2025

(54) OPERATION PLAN CHANGE ASSISTANCE DEVICE, OPERATION PLAN CHANGE ASSISTANCE METHOD, AND RAIL TRAFFIC MANAGEMENT SYSTEM

(71) Applicant: Hitachi, Ltd., Tokyo (JP)

(72) Inventors: Yuko Yamashita, Tokyo (JP); Yuichi Kobayashi, Tokyo (JP); Tsuyoshi Minakawa, Tokyo (JP); Yasuhide Mori, Tokyo (JP); Yumiko Ishido, Tokyo (JP); Kazumasa Tokuhashi, Tokyo (JP); Atsushi Toyama, Tokyo (JP); Hirotake Yoshida, Tokyo (JP)

(73) Assignee: HITACHI, LTD., Tokyo (JP)

( * ) Notice: Subject to any disclaimer, the term of this patent is extended or adjusted under 35 U.S.C. 154(b) by 87 days.

(21) Appl. No.: 18/578,872

(22) PCT Filed: Apr. 28, 2022

(86) PCT No.: PCT/JP2022/019380
§ 371 (c)(1),
(2) Date: Jan. 12, 2024

(87) PCT Pub. No.: WO2023/286425
PCT Pub. Date: Jan. 19, 2023

(65) Prior Publication Data
US 2024/0308558 A1 Sep. 19, 2024

(30) Foreign Application Priority Data
Jul. 13, 2021 (JP) .................. 2021-115476

(51) Int. Cl.
*B61L 27/16* (2022.01)
(52) U.S. Cl.
CPC .................. *B61L 27/16* (2022.01)

(58) Field of Classification Search
CPC ................. B61L 27/12; B61L 27/14
See application file for complete search history.

(56) References Cited

U.S. PATENT DOCUMENTS 2,082,435 A * 6/1937 Wight ............. B61L 23/22
246/242 A
7,840,338 B2 * 11/2010 Paolacci ............ B61L 27/20
701/19
(Continued)

FOREIGN PATENT DOCUMENTS

EP 3 171 304 A1 5/2017
JP 10-250581 A 9/1998
(Continued)

OTHER PUBLICATIONS

International Search Report of PCT/JP2022/019380 Jul. 19, 2022.
(Continued)

*Primary Examiner* — Long T Tran
(74) *Attorney, Agent, or Firm* — MATTINGLY & MALUR, PC

(57) ABSTRACT

An operation plan change assistance system includes a determination model generation unit configured to generate an operation plan change determination model that receives information about a train operation content before a certain point in time and information about a change in an operation plan executed before the point in time and outputs information about a change in operation plan to be executed next; and an operation plan change proposal creation unit configured to input information about a train operation content before a point in time designated by a user and information about a change in an operation plan executed before the designated point in time, create change candidates that are candidates for each change in an operation plan to be executed in stages after the designated point in time, specify (Continued)

a change candidate that satisfies a predetermined condition, and create the specified change candidate as an operation plan change proposal.

9 Claims, 10 Drawing Sheets

(56) References Cited

U.S. PATENT DOCUMENTS

| | | | |
|---|---|---|---|
| 2003/0236598 A1* | 12/2003 | Villarreal Antelo | B61L 27/14 701/19 |
| 2021/0339737 A1* | 11/2021 | Morris | G07C 5/0816 |
| 2022/0185350 A1* | 6/2022 | Kindt | B61L 1/18 |
| 2022/0348242 A1* | 11/2022 | Vujanic | B61L 27/20 |
| 2023/0281532 A1* | 9/2023 | Minakawa | G06Q 50/40 705/7.25 |

FOREIGN PATENT DOCUMENTS

| | | |
|---|---|---|
| JP | 4191497 B2 | 12/2008 |
| JP | 2011-031697 A | 2/2011 |
| JP | 2014-019182 A | 2/2014 |
| JP | 2017-097520 A | 6/2017 |
| JP | 2018-079874 A | 5/2018 |
| JP | 2019-166931 A | 10/2019 |
| JP | 2019-209797 A | 12/2019 |
| JP | 2020-117169 A | 8/2020 |
| JP | 2020-199973 A | 12/2020 |

OTHER PUBLICATIONS

Australian Office Action received in corresponding Australian Application No. 2022312793 dated Mar. 12, 2025.
Japanese Office Action received in corresponding Japanese Application No. 2024-066284 dated Oct. 1, 2024.
Extended European Search Report received in corresponding European Application No. 22841772.1 dated Jun. 10, 2025.
Australian Office Action received in corresponding Australian Application No. 2022312793 dated Jun. 25, 2025.

* cited by examiner

[FIG. 1]
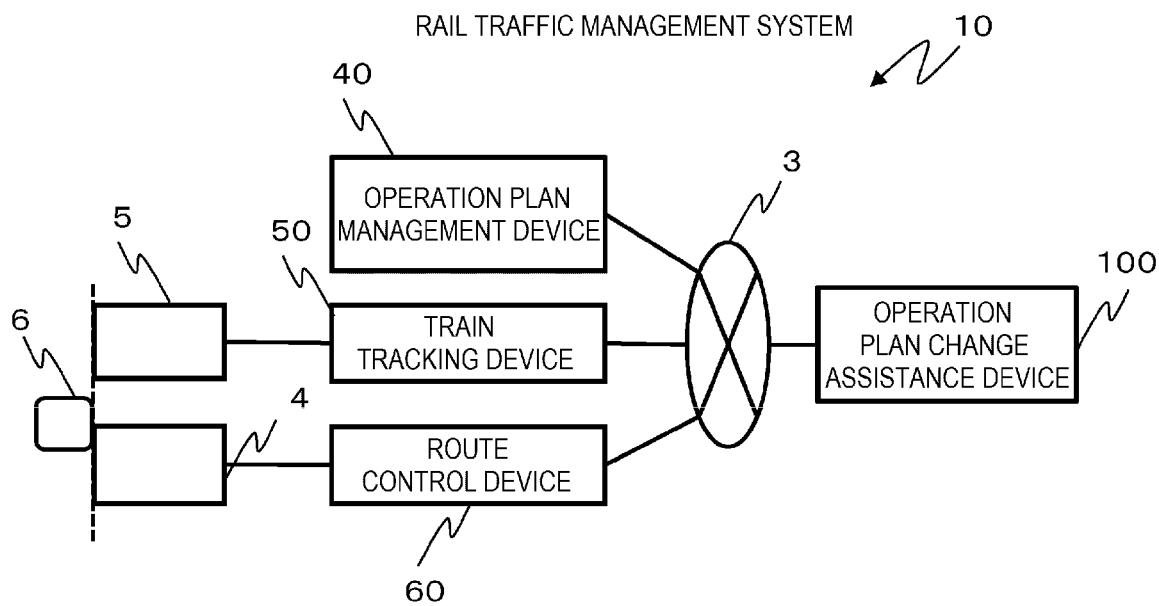

[FIG. 2]
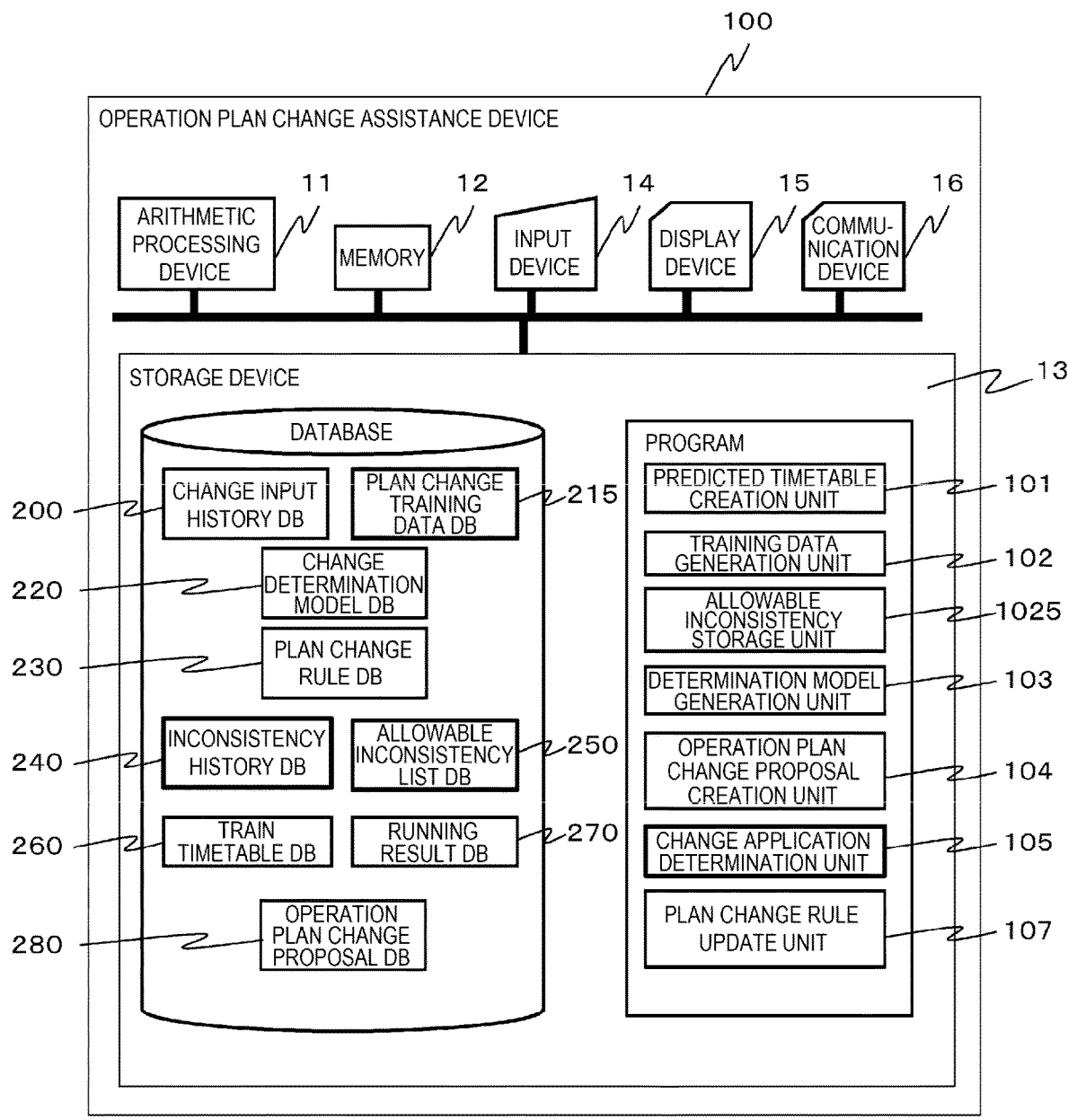

[FIG. 3]

CHANGE INPUT HISTORY DB 200

201 — HINDRANCE

| DATE OF HINDRANCE | HINDRANCE START TIME POINT | HINDRANCE END TIME POINT | HINDRANCE STATION |
|---|---|---|---|
| 20201201 | 7:00 | 8:00 | STATION X |
| : | : | : | : |
| 20201201 | 7:00 | 8:00 | — |
| : | : | : | : |
| 20201201 | 7:00 | 8:00 | STATION Y |
| : | : | : | : |

202 — PLAN CHANGE INPUT

| TRAIN ID | STATION ID | CHANGE TYPE | RELATED TRAIN | CHANGE CONTENT | EXECUTION STATE |
|---|---|---|---|---|---|
| TRAIN N | STATION A | CHANGE IN ORDER | TRAIN M | TRAIN N DEPARTS BEFORE TRAIN M AT STATION A | EXECUTED |
| : | : | : | : | : | : |
| TRAIN M | STATION C | CHANGE IN TRACK | — | CHANGE TRACK OF TRAIN M TO TRACK 4 AT STATION C | NOT EXECUTED |
| : | : | : | : | : | : |
| TRAIN O | STATION A | CHANGE IN ORDER | TRAIN N | TRAIN O DEPARTS BEFORE TRAIN N AT STATION A | EXECUTED |
| : | : | : | : | : | : |

[FIG. 4]
PLAN CHANGE RULE
DELAY OF EARLIER DEPARTED TRAIN CAUSES DELAY IN ARRIVAL ⇒ CHANGE ORDER
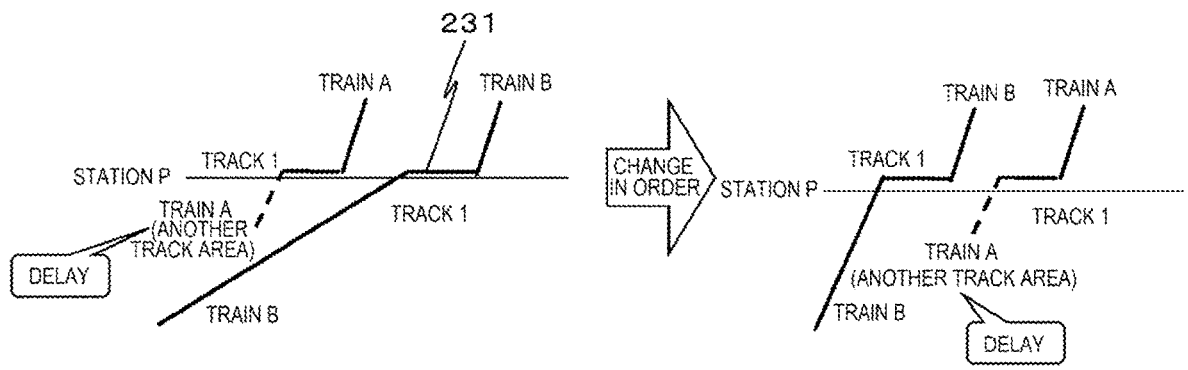
[FIG. 5]
TRAFFIC MANAGEMENT PROCESSING
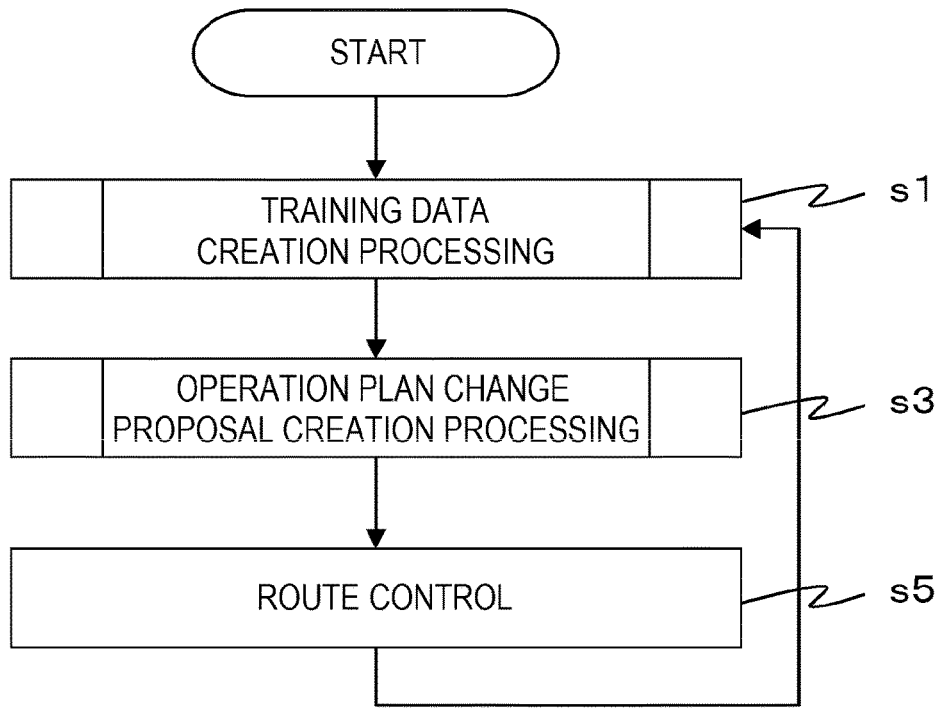

[FIG. 6]
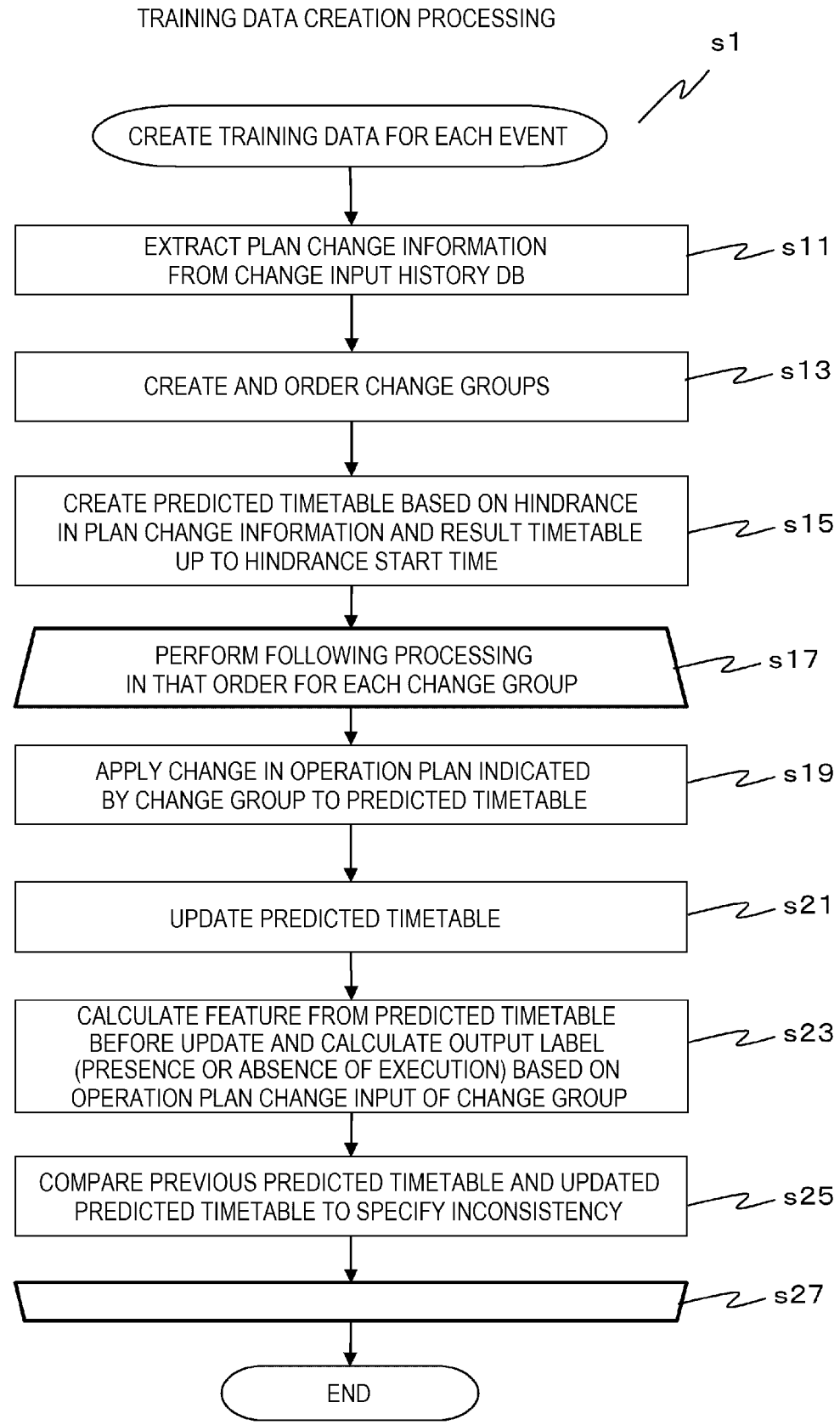

[FIG. 7]
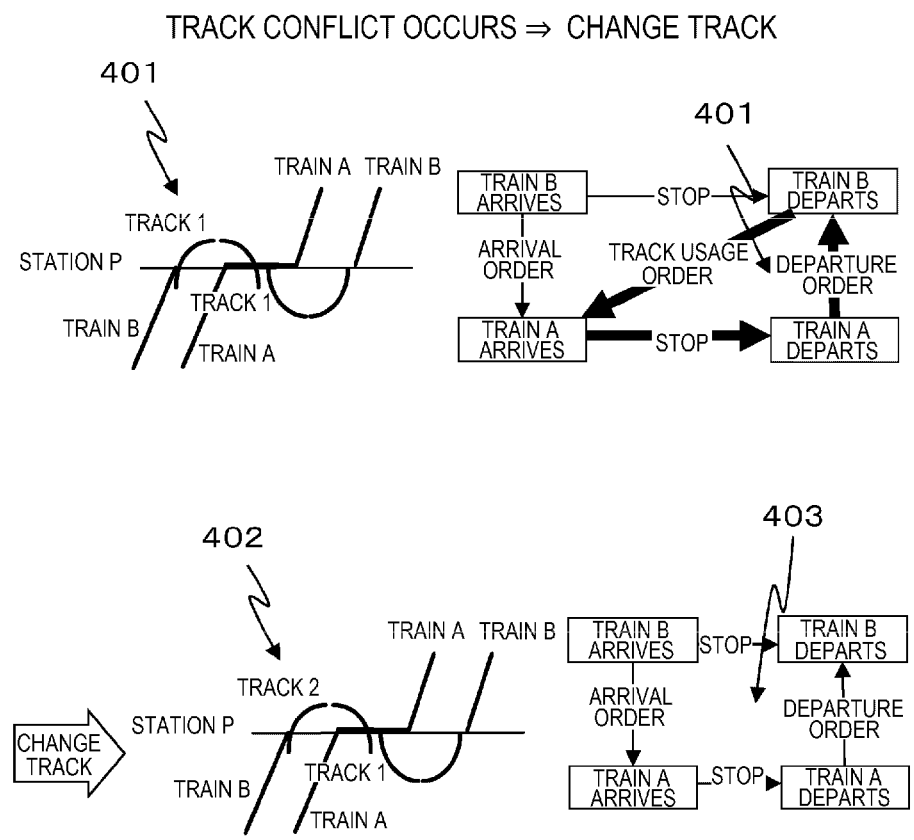

[FIG. 8]
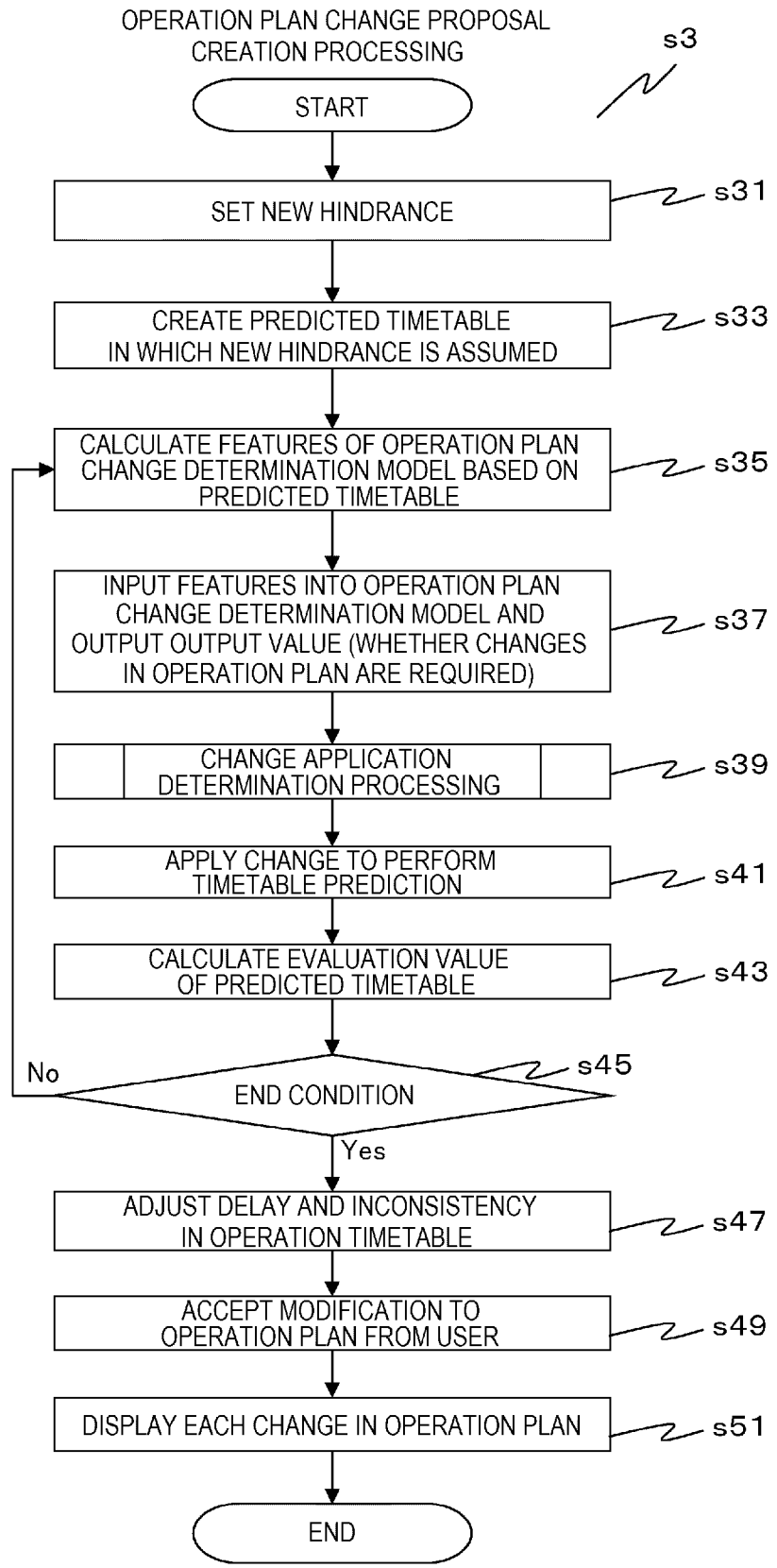

[FIG. 9]
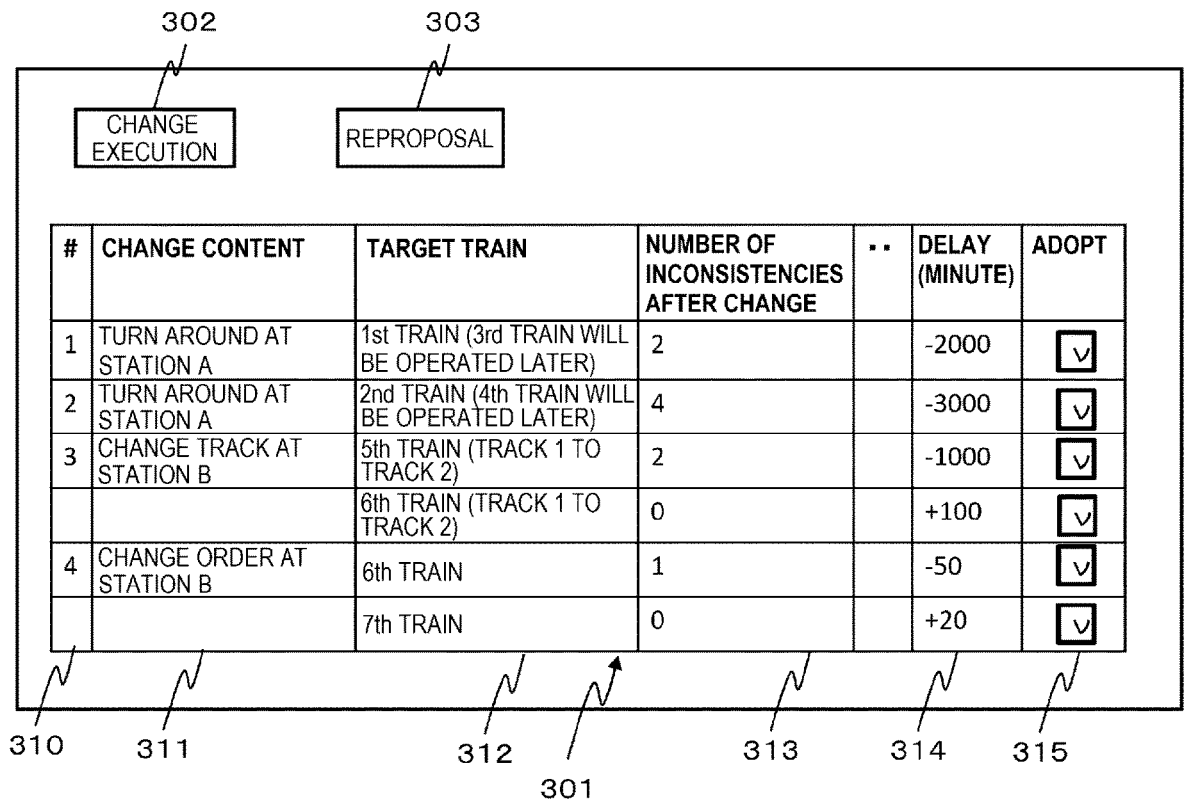

[FIG. 10]
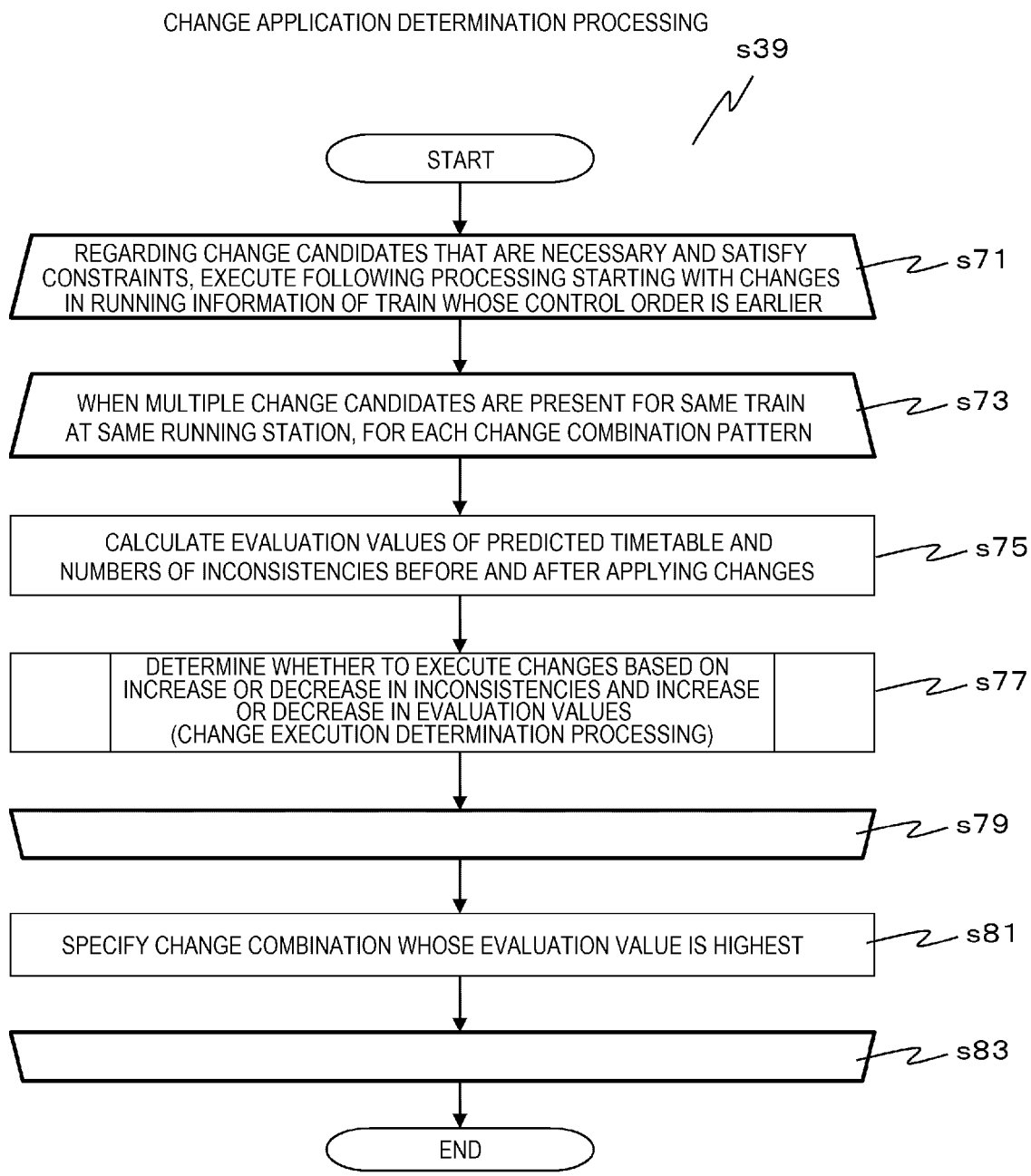

[FIG. 11]
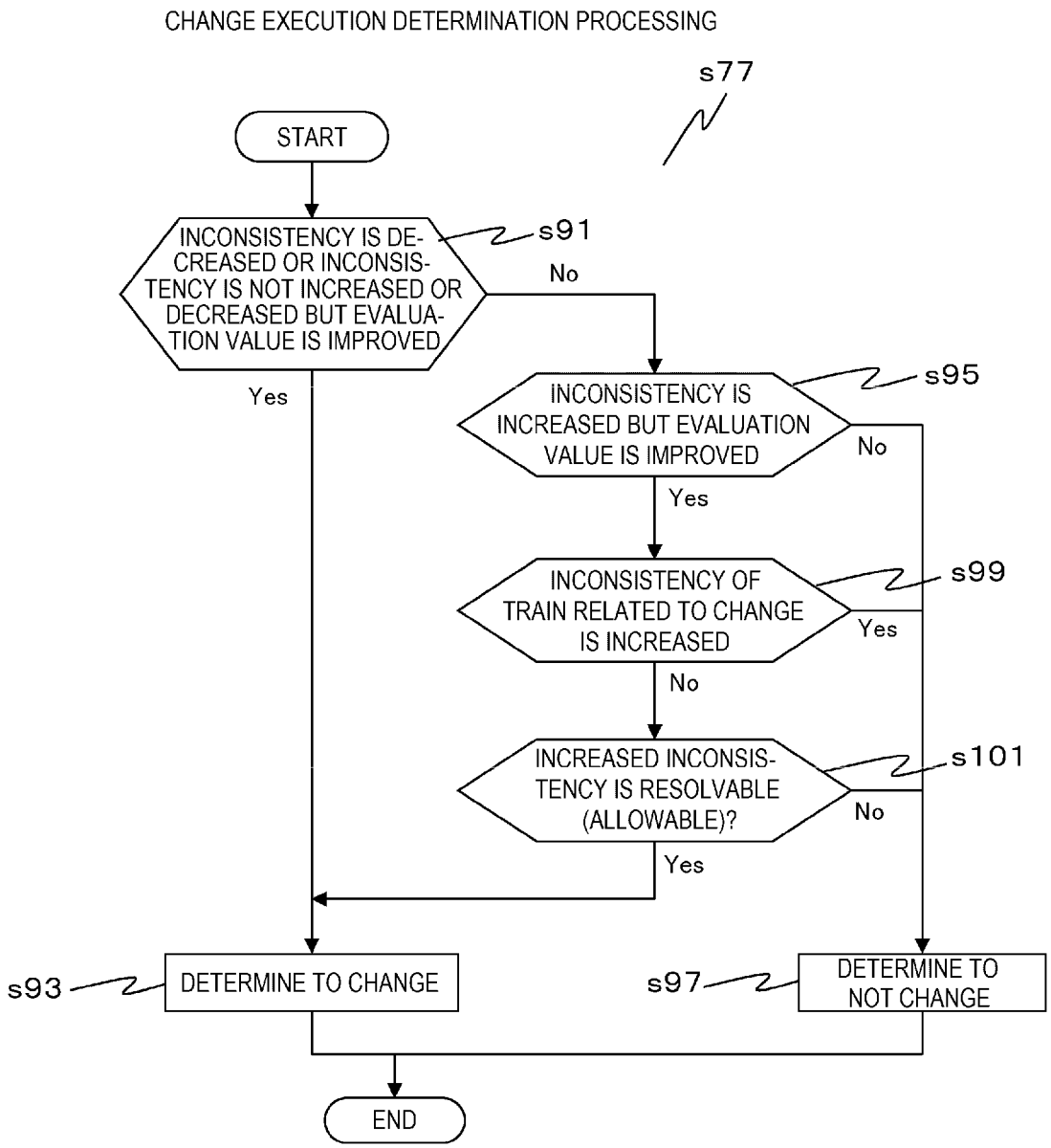

OPERATION PLAN CHANGE ASSISTANCE DEVICE, OPERATION PLAN CHANGE ASSISTANCE METHOD, AND RAIL TRAFFIC MANAGEMENT SYSTEM

CROSS-REFERENCE TO RELATED APPLICATION

The present application claims priority to Japanese Patent Application No. 2021-115476, filed on Jul. 13, 2021, the entire contents of which are incorporated herein by reference.

TECHNICAL FIELD

The present invention relates to an operation plan change assistance device, an operation plan change assistance method, and a rail traffic management system.

BACKGROUND ART

One of the tasks of rail traffic management is an operation plan change task, and an operation plan change assistance system that assists such a task is provided. As a technique related to an operation plan change assistance system, there is known a technique for assisting an operation plan change task by predicting an operation status of each train after a current time based on a running result and an operation plan of each train, which are obtained up to the current time, automatically creating an operation plan change proposal when a delay is expected, and presenting this operation plan change proposal to an operator in charge of traffic management.

For example, PTL 1 discloses an operation management system that assists vehicle traffic management performed by a traffic dispatcher. The operation management system includes an operation rescheduling assistance processing unit including an operation predicting unit that creates, by operation predicting, a predicted timetable for a train up to a point in time when operation rescheduling for changing an operation plan of the train is implemented, and an operation rescheduling proposal determination unit that creates an operation rescheduling necessity determination model based on a past result timetable, which is a result of past train operation, and applies the operation rescheduling necessity determination model to a current-day result timetable, which is a result of current-day train operation, and the predicted timetable, to create an operation rescheduling necessity determination result indicating whether or not operation rescheduling is necessary.

CITATION LIST

Patent Literature

PTL 1: JP2020-117169A

SUMMARY OF THE INVENTION

Technical Problem

However, in the technique disclosed in PTL 1, the determination model determines whether or not operation rescheduling is necessary based on a delay amount, and a combination of a plurality of types of plan changes, an order of plan changes implemented in stages, and presence or absence of an inconsistency that may occur during the plan changes are not utilized for the determination. Therefore, with the technique disclosed in PTL 1, it is difficult to create an operation plan change proposal that is widely accepted by an operator in response to a disruption. In particular, in a situation where an operation timetable is more complex, changes in operation plan need to be implemented in stages to prevent the disruption from spreading, but such a utilization now still largely relies on the knowledge and experience of an operator such as a dispatcher.

The present invention is conceived in view of the current situation, and has as an object to provide an operation plan change assistance device, an operation plan change assistance method, and a rail traffic management system capable of assisting creation of an operation plan change proposal to be executed in stages.

Solution to Problem

One aspect of the invention for solving the above-mentioned problems is an operation plan change assistance device including: a processor; a memory; a determination model generation unit configured to generate an operation plan change determination model that receives information about a train operation content before a certain point in time and information about a change in an operation plan executed before the point in time and outputs information about a change in operation plan to be executed next after the executed operation plan; and an operation plan change proposal creation unit configured to input information about a train operation content before a point in time designated by a user and information about a change in an operation plan executed before the designated point in time into the operation plan change determination model, and create change candidates that are candidates for each change in an operation plan to be executed in stages after the designated point in time by repeating a process of creating information about an operation plan change content based on the information output from the operation plan change determination model one or more times, specify a change candidate that satisfies a predetermined condition from the created change candidates, and create the specified change candidate as an operation plan change proposal.

Further, one aspect of the invention for solving the above-mentioned problems is an operation plan change assistance method to be executed by an information processing device, the method including: determination model generation processing of generating an operation plan change determination model that receives information about a train operation content before a certain point in time and information about a change in an operation plan executed before the point in time and outputs information about a change in operation plan to be executed next after the executed operation plan; and operation plan change proposal creation processing of inputting information about a train operation content before a point in time designated by a user and information about a change in an operation plan executed before the designated point in time into the operation plan change determination model, and creating change candidates that are candidates for each change in an operation plan to be executed in stages after the designated point in time by repeating a process of creating information about an operation plan change content based on the information output from the operation plan change determination model one or more times, specifying a change candidate that satisfies a predetermined condition from the created change candidates, and creating the specified change candidate as an operation plan change proposal.

Further, one aspect of the invention for solving the above-mentioned problems is a rail traffic management system including: an operation plan change assistance device having a processor; a memory; a determination model generation unit configured to generate an operation plan change determination model that receives information about a train operation content before a certain point in time and information about a change in an operation plan executed before the point in time and outputs information about a change in operation plan to be executed next after the executed operation plan; an operation plan change proposal creation unit configured to input information about a train operation content before a point in time designated by a user and information about a change in an operation plan executed before the designated point in time into the operation plan change determination model, create change candidates that are candidates for each change in an operation plan to be executed in stages after the designated point in time by repeating a process of creating information about an operation plan change content based on the information output from the operation plan change determination model one or more times, specify a change candidate that satisfies a predetermined condition from the created change candidates, and create the specified change candidate as an operation plan change proposal; and a route control device configured to control a train or equipment of a train based on the created operation plan change proposal.

Advantageous Effects of the Invention

According to the invention, it is possible to assist creation of an operation plan change proposal to be executed in stages.

Problems, configurations, and effects other than those described above will become apparent in the following description of embodiments.

BRIEF DESCRIPTION OF THE DRAWINGS

FIG. 1 is a diagram illustrating an example of a configuration of a rail traffic management system according to the present embodiment.

FIG. 2 is a diagram illustrating an example of a configuration of an operation plan change assistance device.

FIG. 3 is a diagram illustrating an example of a change input history DB.

FIG. 4 is a diagram illustrating an example of a plan change rule.

FIG. 5 is a flowchart illustrating an overview of rail traffic management processing performed by the rail traffic management system.

FIG. 6 is a flowchart illustrating an example of training data creation processing.

FIG. 7 is a diagram illustrating details of allowable inconsistency information.

FIG. 8 is a flowchart illustrating details of operation plan change proposal creation processing.

FIG. 9 is a diagram illustrating an example of a change proposition screen.

FIG. 10 is a flowchart illustrating details of change application determination processing.

FIG. 11 is a flowchart illustrating details of change execution determination processing.

DESCRIPTION OF EMBODIMENTS

FIG. 1 is a diagram illustrating an example of a configuration of a rail traffic management system 10 according to an embodiment. The rail traffic management system 10 includes an operation plan management device 40 that manages information used to manage train operation such as an operation plan (train timetable and the like) and an operation result of each train 6, a train tracking device 50 that tracks running of each train 6 and acquires the operation result, a route control device 60 that controls a route of each train 6, and an operation plan change assistance device 100 that assists changes in operation plan of each train 6.

Regarding the information used to manage train operation, such as an operation plan, an operation result, and an operation plan change history, the operation plan management device 40 stores information about a current day on which traffic management is being implemented and information about a previous day or earlier. After the end of train operation on one day, the operation plan management device 40 adds each piece of information about an original operation plan for that day, an operation result for the entire day, and a plan change history for the entire day to a past history database as past history data, and further initializes various information for traffic management on a next day. Specifically, for example, the operation plan management device 40 updates the operation plan to an operation plan for the next day, clears the operation result, and clears the plan change history. Further, when receiving an operation plan change proposal from the operation plan change assistance device 100, the operation plan management device 40 changes the operation plan based on the received operation plan change proposal, and further sets the received operation plan change information and a current time as a group and stores the group as a plan change history.

The train tracking device 50 acquires vehicle ontrack status information from various types of equipment 5, and creates an operation result (running history) of each train 6 based on the acquired ontrack status information and the operation plan. The train tracking device 50 transmits the created operation result to the operation plan change assistance device 100.

The route control device 60 automatically controls running (route) of each train 6 by transmitting instruction information to the train 6 or equipment 4 such as a signal or a point machine based on the operation plan of the train 6 or the like.

When the train operation is hindered due to an event such as an accident or a natural disaster, the operation plan change assistance device 100 generates an operation plan change proposal for performing staged changes in operation plan for the purpose of restoring the train operation in response to the hindrance, based on an operation plan change determination model described below. A detailed configuration of the operation plan change assistance device 100 will be described later (FIG. 2).

The operation plan management device 40, the train tracking device 50, the route control device 60, and the operation plan change assistance device 100 are communicably connected by a wired or wireless communication network 3 such as a communication line (data bus), a dedicated line, a local area network (LAN), a wide area network (WAN), or Internet.

Next, the configuration of the operation plan change assistance device 100 will be explained.

Operation Plan Change Assistance Device

FIG. 2 is a diagram illustrating an example of a configuration of the operation plan change assistance device 100. The operation plan change assistance device 100 includes an arithmetic processing device 11 such as a central processing unit (CPU), a digital signal processor (DSP), a graphics processing unit (GPU), or a field-programmable gate array (FPGA), a memory 12 such as a read only memory (ROM) and a random access memory (RAM), a storage device 13 such as a hard disk drive (HDD) or a solid state drive (SSD), an input device 14 including a mouse, a keyboard, and the like, a display device 15 including a liquid crystal display or an organic electro-luminescence (EL) display, or the like, and a communication device 16 including a network interface card (NIC), a wireless communication module, an universal serial interface (USB) module, a serial communication module, or the like.

The operation plan change assistance device 100 also includes functional units (programs) including a predicted timetable creation unit 101, a training data generation unit 102, an allowable inconsistency storage unit 1025, a determination model generation unit 103, an operation plan change proposal creation unit 104, a change application determination unit 105, and a plan change rule update unit 107.

The predicted timetable creation unit 101 uses an operation result (information about a hindrance to train operation when the train operation is hindered) and a current operation plan (planned timetable) of each train as input values to predict a future operation plan (predicted timetable). The predicted timetable creation unit 101 is, for example, a simulator that performs macro-type simulation, and uses arrival times of each train at each station or departure times of each train from each station as determination variables to calculate these times. As a train operation simulator that performs macro-type simulation, for example, a simulator based on a concept of a program evaluation and review technique (PERT) is known. The predicted timetable creation unit 101 also determines arrival times of each train at each station or departure times of each train from each station for times before the current time based on the operation result, and outputs these times as a simulation result.

The predicted timetable creation unit 101 outputs the predicted timetable as well as information about an inconsistency (route conflict) when the inconsistency is present in the train operation in the predicted timetable. An inconsistency refers to a situation where the trains are unable to run due to route conflicts between the trains, and for example, is a track conflict, such as a plurality of trains entering the same track at the same time period, or a contradiction in order of departure between a plurality of trains.

The training data generation unit 102 generates information about staged changes in operation plan considered (inputted) and executed by an operator such as a dispatcher in the past (that is, information about an order of the changes in operation plan) as training data for the operation plan change determination model. In the embodiment, the training data generation unit 102 generates, for a hindrance that occurred in the past, information in which information about a train operation content before a point in time when the hindrance occurs, information about changes in operation plan executed before the point in time when the hindrance occurs, and information about changes in operation plan executed at a next stage after the executed operation plan (specifically, a change content, whether the changes are actually executed after consideration, and the like) are associated.

In the embodiment, the operation plan change determination model is a trained model configured as a neural network including a plurality of input and output layers, but may be other types of trained models.

Here, the plurality of changes in operation plan for the same train at the same station (for example, changes in departure and arrival times and changes in departure and arrival tracks) may be considered as one operation plan change unit (changes in operation plan to be executed simultaneously), and the same changes in operation plan for trains whose order of departure at the same station is consecutive may be considered as one operation plan change unit.

The allowable inconsistency storage unit 1025 stores information about changes in operation plan in which a train inconsistency occurs due to a change among changes in operation plan executed in stages in the past, but the inconsistency is resolved by a change at a subsequent stage (hereinafter, referred to as allowable inconsistency information).

The determination model generation unit 103 generates the operation plan change determination model based on the training data generated by the training data generation unit 102.

In other words, the operation plan change determination model receives information about a train operation content before a certain point in time and information about a change in operation plan executed before that point in time, and outputs information about a change in operation plan to be executed next after the executed operation plan. The above-mentioned information about a change in operation plan executed before a point in time includes information about a type and number of times of the above-mentioned change in operation plan executed before the point in time.

In the embodiment, as described above, the change in operation plan may be obtained by combining a plurality of change elements (for example, including change elements of a change in departure and arrival times and a change in track for a certain train). The operation plan change assistance device 100 sets these changes in operation plan including a plurality of change elements as the same changes in operation plan (hereinafter, referred to as change groups).

The operation plan change proposal creation unit 104 sequentially inputs, regarding a hindrance designated by a user, or a delay that naturally occurs during rush hours (hereinafter, referred to as a new hindrance), an operation timetable based on the new hindrance (predicted timetable) or an operation timetable calculated by the operation plan change determination model (predicted timetable) into the operation plan change determination model, thereby creating information about changes in operation plan at least once, creating change candidates that are candidates for changes in operation plan to be executed in stages after a point in time of the new hindrance, specifying change candidates that satisfy predetermined conditions from the created change candidates, and creating the specified change candidates as operation plan change proposals.

For example, the operation plan change proposal creation unit 104 calculates an evaluation value of an operation plan (predicted timetable) when the changes indicated by each of the change candidates are applied, determines whether the calculated evaluation value is an optimal value, and specifies the above-mentioned change candidate (as a change candidate that satisfies the above-mentioned predetermined conditions) when it is determined that the evaluation value is an optimal value. The predetermined conditions to be satisfied include resolution of an inconsistency, operational constraints (time required for a train to turn back at a station, conditions for train departure order, and the like), plan change rules described below, and the like.

When the change candidate includes a plurality of change elements, the change application determination unit 105 creates a plurality of combinations (patterns) of the change elements in the change candidate, calculates a fluctuation in evaluation value capable of indicating an effect of the changes in operation plan for each of the created combinations, and determines a combination of change elements to be specified as the change candidate among the plurality of combinations based the calculated fluctuation in evaluation value.

Further, the change application determination unit 105 determines, based on the allowable inconsistency information, whether the inconsistency will be resolved at a subsequent stage by the change indicated by the change candidate created by the operation plan change proposal creation unit 104, and specifies the created change candidate (as the change candidate that satisfies the above-mentioned predetermined conditions) when it is determined that the inconsistency will be resolved at a subsequent stage.

The plan change rule update unit 107 generates or updates plan change rules, which are rules that are predetermined by an administrator or the like and are applied when changing the operation plan. The plan change rules include, for example, a rule for forcibly resolving a delay or inconsistency of a train when the delay or inconsistency occurs in an operation timetable, and a rule capable of resolving the delay or inconsistency even when the delay or inconsistency cannot be directly controlled by the operation plan change proposal created by the operation plan change determination model.

Next, the operation plan change assistance device 100 stores data of a change input history DB 200, a plan change training data DB 215, a change determination model DB 220, a plan change rule DB 230, an inconsistency history DB 240, an allowable inconsistency list DB 250, a train timetable DB 260, and a running result DB 270, and an operation plan change proposal DB 280. Here, these data are stored as databases, but storage formats of these data are not particularly limited.

The change input history DB 200 stores a history of changes in operation plan that are input in the past by an operator such as a dispatcher and are performed in stages.
(Change Input History DB)

FIG. 3 is a diagram illustrating an example of the change input history DB 200. The change input history DB 200 includes data items including a hindrance 201 in which information about a hindrance are set, and a plan change input 202 in which input information about a change in operation plan regarding the hindrance 201 are set.

Among these, the hindrance 201 includes data items including a date 203 in which a date when the hindrance occurred is set, a hindrance occurrence time 204 which is a time when the hindrance occurred, a hindrance end time 205 that is a time when the hindrance ended, and a hindrance station 206, which is a place (station and the like) where the hindrance occurred.

The plan change input 202 includes data items including a train ID 207 in which an ID of a train to be subjected to a change (train to be changed) in operation plan due to the hindrance 201 is set, a station ID 208 in which an ID of a station to be subjected to the change (station to be changed) in operation plan is set, a change type 209 in which an ID of a type of the change (change type) in operation plan is set, a related train 210 in which an ID of another train to be changed (related train) due to the change in operation plan of the train to be changed is set, a change content 211 in which a specific content of a change in operation plan specified by the train ID 207, the station ID 208, the change type 209, and the related train 210 is set, and an execution state 212 in which information about whether the change in operation content indicated by the change content 211 is actually performed is set. For example, in the change type 209, information such as a change in departure and arrival order for a train at a station, and a change in departure and arrival track for a train are set.

In addition, staged changes in operation plan are performed in response to one hindrance that occurs during train operation, and therefore, the change input history DB 200 may include a plurality of records for the hindrance on the same date. The change input history DB 200 may be automatically set or may be input by an operator such as a dispatcher.

Subsequently, as illustrated in FIG. 2, the plan change training data DB 215 stores the training data generated by the training data generation unit 102.

The change determination model DB 220 stores the operation plan change determination model generated by the determination model generation unit 103.

The plan change rule DB 230 stores the plan change rules. For example, the plan change rule DB 230 stores a train operation content and a corresponding change content in association with each other when a change in operation plan is performed.
(Plan Change Rule)

FIG. 4 is a diagram illustrating an example of the plan change rule. In a case 231 where a delay of a train arriving at a certain station causes a delay in arrival of another train at this station, an arrival order and a departure order of both the trains at the station are changed. The plan change rule stores information including various order information and delay information of the trains before changing the arrival order or the departure order, and various orders of the trains (including the related train) after changing the arrival order or departure order.

Next, as illustrated in FIG. 2, the inconsistency history DB 240 stores information about a history of occurrence and resolution of an inconsistency in each of a train operation content in the past and a predicted train operation content (predicted timetable).

The allowable inconsistency list DB 250 stores a history of an inconsistency that occurred but was subsequently resolved (allowable inconsistency information) among the inconsistencies in the inconsistency history DB 240.

The train timetable DB 260 stores information about a past operation plan (past operation timetable) and a predicted operation content (predicted timetable).

The running result DB 270 stores a running history (operation result) of each train in the past.

The operation plan change proposal DB 280 stores the operation plan change proposal created by the operation plan change proposal creation unit 104.

Each function of the operation plan change assistance device 100 described above is implemented by reading and executing each program stored in the memory 12 or storage device 13 by the arithmetic processing device 11. Further, the above-mentioned program can be recorded on a recording medium and distributed, for example.

Next, processing performed by the rail traffic management system 10 will be explained.

FIG. 5 is a flowchart illustrating an overview of rail traffic management processing performed by the rail traffic management system 10.

First, the operation plan change assistance device 100 executes training data creation processing of creating the training data for the operation plan change determination model in advance (s1). The operation plan change assistance device 100 may execute the training data creation processing s1 at a predetermined timing (for example, at a predetermined time such as after the end of daily operation, or at a predetermined time interval), or may execute the training data creation processing s1 at a timing when the change input history DB 200 is updated.

Then, the operation plan change assistance device 100 generates the operation plan change determination model based on the training data created in s1. The operation plan change assistance device 100 executes operation plan change proposal creation processing s3 of creating a new operation plan (operation plan change proposal) using the generated operation plan change determination model when a hindrance such as a delay or breakdown of a vehicle occurs during daily train operation (s3).

The operation plan change assistance device 100 displays the operation plan change proposal created in s3 on the display device 15 and requests an operator or the like to input an approval. When the approval input is received, the operation plan change assistance device 100 transmits the above-mentioned created operation plan change proposal to the operation plan management device 40. The operation plan management device 40 changes the operation plan based on the received operation plan change proposal, and further sets the received operation plan change proposal and a current time as a group and stores the group as a plan change history. The route control device 60 controls the trains 6 and the equipment 5 by transmitting instruction information to the trains 6 and the equipment 5 based on the operation plan changed by the operation plan management device 40 (s5).

After that, processing after s1 or s3 are repeated. The details of the training data creation processing s1 and the operation plan change proposal creation processing s3 will be described below.

Training Data Creation Processing

FIG. 6 is a flowchart illustrating an example of the training data creation processing s1.

The training data generation unit 102 extracts information about one hindrance (hereinafter, referred to as target hindrance) that occurred in the past (hereinafter, referred to as target hindrance information) and information about changes in operation plan corresponding to the hindrance (hereinafter, referred to as plan change information) from the change input history DB 200 (s11). Specifically, the training data generation unit 102 selects all records having the same hindrance date 203 or the hindrance 201 from the change input history DB 200, and acquires contents of the selected records.

The training data generation unit 102 classifies the changes in operation plan in the plan change information extracted in s11 into a plurality of groups (change groups), and orders the change groups (s13).

For example, the training data generation unit 102 orders the changes in operation plan according to an order of execution of the changes in operation plan (a chronological order in which the operation plan management device 40 instructs the route control device 60 to perform control). At this time, the training data generation unit 102 classifies the changes in operation plan into a plurality of groups for each train to be changed, station to be changed, and target type, and changes in operation plan belonging to the same group are set as the same changes in operation plan (that is, change groups). In determination of the change group, changes that do not depend on control order related to the running of another train can be set as changes belonging to the same group, but each change in operation plan may be set as one change group. Further, it is assumed that one or more changes in operation plan belong to one change group.

Here, the training data generation unit 102 creates a train operation content (predicted timetable) when the target hindrance occurs (s15).

Specifically, the training data generation unit 102 creates a predicted timetable by inputting the target hindrance information, an operation result up to the occurrence of the target hindrance (running result DB 270), and a train timetable which is an operation plan after the occurrence of the target hindrance (train timetable DB 260) into the predicted timetable creation unit 101.

Next, the training data generation unit 102 selects a change group that has not been selected so far and comes first in order (higher order change group) among the change groups classified in s13 (s17).

Then, the training data generation unit 102 creates a predicted timetable when the change group selected in s17 (selected group) is applied (s19, s21).

For example, the training data generation unit 102 updates the predicted timetable by inputting a current predicted timetable (predicted timetable created in s15 or last updated in s21) and changes in operation plan indicated by the selected group to the predicted timetable creation unit 101.

Next, the training data generation unit 102 calculates information about a train operation content and a train operation plan before the changes in operation plan, which are features in the training data for the operation plan change determination model, based on information about a predicted timetable before the application (predicted timetable before executing s19 and s21) (s23).

These features are features of each train at each station, and include a departure and arrival delay time of each train (for example, a train to be changed or a related train that arrives and departs before or after the train to be changed) at each station to be changed before the changes in operation plan related to the selected group, and information about each change in operation plan executed before the changes in operation plan related to the selected group (for example, information indicating a change type of an operation plan in which changes are executed and a stage of each change, and when the change is a first (first stage) change, this information will not be set).

In addition, these features include, for example, hindrance information of a target hindrance corresponding to the selected group, which is acquired from the change input history DB 200, or inconsistency information before the changes in operation plan related to the selected group, which is acquired from the inconsistency history DB 240.

These features also include, for example, the number of times the train to be changed related to the selected group has become a train to be changed in the past, which is calculated based on the change input history DB 200. These features also include, for example, information about the number of times the same types of changes in operation plan as the changes in operation plan related to the selected group have been performed in the past, which is calculated based on the change input history DB 200.

Further, the training data generation unit 102 generates information about an actually executed change in operation plan among the changes in operation plan indicated by the selected group, as information that becomes an output label in the training data of the operation plan change determination model (s23).

For example, the training data generation unit 102 acquires information about a change that can be applied to the operation plan related to the selected group and information about whether the change is actually performed from the change content 211 and the execution state 212 of the change input history DB 200, respectively. A change that can be applied to the operation plan but is not present in the change input history DB 200 is not actually performed, and therefore the output label is "No".

Furthermore, the training data generation unit 102 compares the predicted timetables before and after the update specified or calculated in s19 and s21, and stores a resolution t of an inconsistency as allowable inconsistency information in the allowable inconsistency list DB 250 when the inconsistency is resolved before and after the changes in operation plan related to the selected group (s25).

For example, the training data generation unit 102 acquires all information about the inconsistency from information output when creating the predicted timetable before executing s19 and s21. The training data generation unit 102 also acquires all information about the inconsistency from information output when creating the predicted timetable after executing s19 and s21. Then, the training data generation unit 102 compares the obtained information about the inconsistency, and stores information about the inconsistency resolved by executing steps s19 and s21 in the allowable inconsistency list DB 250.

(Allowable Inconsistency Information)

Here, FIG. 7 is a diagram illustrating an example of allowable inconsistency information. First, a conflict between departure and arrival tracks of two trains occurs as an inconsistency 401 (a track usage order in which a train A arrives after a train B departs, a departure order in which a train B departs after the train A departs, and an order contradiction between arrival and departure events, such as the train A departing after arriving at station P). When the departure and arrival tracks of these two trains are different due to the changes in operation plan (402), the inconsistency 401 is resolved. In the allowable inconsistency information, a set of arrival and departure events of the trains and stations of such inconsistency 401 and a state 403 where the inconsistency is resolved, and an order relationship thereof are stored, respectively.

Next, as illustrated in FIG. 6, when a change group in a next order (stage) of the currently selected change group is present, the training data generation unit 102 repeats the processing from s17 to select that change group (s27).

The training data generation unit 102 repeats the above processing for all the hindrances stored in the change input history DB 200. The training data creation processing s1 is then ended.

After that, the determination model generation unit 103 updates the operation plan change determination model by inputting the training data generated in the training data creation processing s1 into the operation plan change determination model and performing machine learning.

Operation Plan Change Proposal Creation Processing

FIG. 8 is a flowchart illustrating details of the operation plan change proposal creation processing s3. The operation plan change proposal creation processing s3 is started automatically or by designation of a user, for example, when a new hindrance occurs in train operation.

The operation plan change proposal creation unit 104 sets information about the newly occurred hindrance (hereinafter, referred to as a new hindrance) (s31). For example, the operation plan change proposal creation unit 104 may accept input of the information about the new hindrance from the user, or automatically generate the information about the new hindrance based on information acquired from a predetermined monitoring system, the train tracking device 50, or the like.

The operation plan change proposal creation unit 104 creates predicted information (predicted timetable) about a train operation content after the time of the occurrence of the new hindrance (s33). Specifically, the operation plan change proposal creation unit 104 creates the predicted timetable by inputting the information about the new hindrance set in s31, an operational result up to the time of occurrence of the new hindrance (running result DB 270), and a current t operation timetable into the predicted timetable creation unit 101.

The operation plan change proposal creation unit 104 calculates features of the operation plan change determination model (the same features as the features calculated in s23) based on the predicted timetable generated in s33 (or a predicted timetable calculated in s41, which will be described later) (s35). Specifically, the operation plan change proposal creation unit 104 extracts features at each station of each train based on data extracted from the predicted timetable.

The operation plan change proposal creation unit 104 inputs the features calculated in s35 into the operation plan change determination model, thereby acquiring information about changes in operation plan (that is, change candidates determined to be "necessary" by the operation plan change determination model among applicable operation plan change candidates), which will be outputted from the operation plan change determination model (s37).

The change application determination unit 105 executes change application determination processing s39 to determine an operation plan in which changes that satisfy the predetermined conditions and are actually performed among the changes in operation plan (change candidates) output in s37. Details of the change application determination processing s39 will be described later.

The operation plan change proposal creation unit 104 creates a predicted timetable for a next stage based on the changes in operation plan (change group) determined by the change application determination processing s39 (s41). For example, the operation plan change proposal creation unit 104 creates a predicted timetable by inputting information about the operation plan, which is obtained by applying the changes in operation plan determined by the change application determination processing s39 to a current predicted timetable, and the operation result into the predicted timetable creation unit 101.

The operation plan change proposal creation unit 104 calculates an evaluation value of the predicted timetable created in s41 (s43). For example, the operation plan change proposal creation unit 104 calculates a total delay time by adding up delayed departure and arrival times at all stations of all trains in the predicted timetable.

The operation plan change proposal creation unit 104 may calculate other types of evaluation values, such as the number of canceled trains among all the trains, a transportation volume of all the trains, impact on operations, a recovery time from the new hindrance until an original timetable is restored, or a combination thereof. A fluctuation in the evaluation values before and after the changes in the predicted timetable represents effects of the changes in operation plan.

The operation plan change proposal creation unit 104 specifies (determines) each change in operation plan (change candidate) determined so far in the change application determination processing s39 as a change in operation plan that constitutes the operation plan change proposal by determining whether a current evaluation value indicates an optimal value (whether the current evaluation value is converged to the optimal value) based on the evaluation value calculated in s43 and evaluation values calculated in s43 before this time (s45).

For example, the operation plan change proposal creation unit 104 determines each change in operation plan (change candidate) determined so far in the change application determination processing s39 as the change in operation plan that constitutes the operation plan change proposal when a difference between an evaluation value calculated in s45 last time and an evaluation value calculated in s45 this time is less than or equal to a predetermined threshold, or when a maximum value is found among evaluation values calculated in s45 a predetermined number of times or more.

When the change in operation plan determined so far in s39 is specified as the change in operation plan that constitutes the operation plan change proposal (s45: Yes), the operation plan change proposal creation unit 104 executes processing in s47, and when the change in operation plan determined so far in s39 is not specified as the change in operation plan that constitutes the operation plan change proposal (s45: No), the operation plan change proposal creation unit 104 creates a new change candidate of the operation plan based on a timetable prediction result created in s41, that is, repeats the processing from s35.

In s47, the operation plan change proposal creation unit 104 confirms whether any delays or inconsistencies of the trains remain in the predicted timetable as a result of all the changes in operation plan determined in the previous processing, and when a delay or inconsistency remains, the operation plan change proposal creation unit 104 further forcibly changes the current changes in operation plan to resolve the delay or inconsistency.

For example, the operation plan change proposal creation unit 104 searches for changes in operation plan corresponding to the operation content extracted from the predicted timetable by referring to the plan change rule DB 230, and applies the searched changes in operation plan to the corresponding predicted timetable.

Further, the operation plan change proposal creation unit 104 accepts further input of changes in operation content from the user (s49). The operation plan change proposal creation unit 104 may store the input changes in the plan change rule DB 230 as new plan change rules.

The operation plan change proposal creation unit 104 integrates train operation plan change contents determined in the previous processing, and generates an operation plan change proposal. The operation plan change proposal creation unit 104 creates change groups for the generated operation plan change proposals in the same way as the processing in s13 in the training data creation processing, and displays each change group on a predetermined screen (change proposition screen) (s51). The user modifies the operation plan change proposal as necessary while viewing the change proposition screen.

After that, the training data generation unit 102 acquires the predicted timetable (operation plan) modified as described above, and updates the training data based on the acquired predicted timetable. The operation plan change proposal creation processing s3 is then ended.

Change Proposition Screen

FIG. 9 is a diagram illustrating an example of a change proposition screen 300. The change proposition screen 300 includes an operation plan change display field 301, a change execution designation field 302, and a reproposal field 303.

In the operation plan change display field 301, a list of changes in operation plan (change groups) at each stage, which constitute the operation plan change proposal generated by the operation plan change proposal creation processing s3, are displayed in accordance with an order of the change groups (that is, in accordance with an order of control of the trains or equipment). Specifically, in the operation plan change display field 301, a content 311 of each change in operation plan in the change group 310, a train to be changed 312 in each change in operation plan, the number of inconsistencies 313 present in the predicted timetable after applying each change in operation plan, and increase or decrease in delay time 314 after applying each change in operation plan are displayed. Although the number of inconsistencies and the delay time are displayed here, values and change values of other evaluation indicators necessary for the user to determine whether to apply each change in operation plan may also be displayed. The operation plan change display field 301 also includes an adoption selection field 315 that is selected by the user when adopting each change group (or each change within the change group) and determining the change in operation plan.

The change execution designation field 302 is designated by the user when applying (sending to the operation plan management device 40) the change group (or change within the change group) for which the adoption selection field 315 is selected in the operation plan change display field 301.

When discarding a change group (or a change within the change group) displayed in the operation plan change display field 301, the user designates the change group to be discarded by canceling the selection in the adoption selection field 315. When the user cancels the selection in the adoption selection field 315, the selection in the adoption selection field 315 of a (lower) change group in an order after the change group whose selection is canceled (or a change within the change group) is also automatically canceled.

The reproposal field 303 is designated by the user when executing the processing of the operation plan change proposal creation unit 104 again without performing any changes that are not selected in the adoption selection field 315 after the user determines the change selected in the adoption selection field 315 in the change execution designation field 302 among the change groups (or changes within the change groups) displayed in the operation plan change display field 301.

Change Application Determination Processing

Next, FIG. 10 is a flowchart illustrating details of the change application determination processing s39.

First, the change application determination unit 105 extracts change candidates that are determined to be necessary in s37 and satisfy the constraints.

Then, the change application determination unit 105 selects a change candidate having an earliest order among the change candidates that have not been selected so far (a change candidate related to a train running station where train control needs to be the quickest) from the extracted change candidates (s71).

Regarding the change candidate related to the train running station, which is selected in s71, when a plurality of change candidates to be performed are present for the same train at the same station (for example, track change and order change), the change application determination unit 105 selects one combination among possible combinations of the change candidates (s73) (when only one change candidate is present, selects that one). The change application determination unit 105 executes the following processing of s75 to s79 for the selected combination.

That is, the change application determination unit 105 calculates an evaluation value of a predicted timetable before applying the combination (hereinafter, referred to as a selected combination candidate) selected in s73 (hereinafter, referred to as a pre-application timetable), and an evaluation value of a predicted timetable after applying the selected combination candidate (hereinafter, referred to as a post-application timetable) (s75). The change application determination unit 105 also calculates information about inconsistencies in the pre-application timetable (the number of inconsistencies) and information about inconsistencies in the post-application timetable (the number of inconsistencies).

Next, the change application determination unit 105 executes change execution determination processing s77 to determine whether the selected combination candidate is determined as a change candidate based on increase or decrease in the evaluation value due to the changes in operation plan related to the selected combination candidate and increase or decrease in the number of inconsistencies related to the selected combination candidate calculated in s75. Details of the change execution determination processing s77 will be described later.

The change application determination unit 105 executes the above processing of s73 to s77 for all the combinations of change candidates related to the train running station selected in s71 (s79).

Then, the change application determination unit 105 specifies a combination of change candidates having a highest evaluation value among the combinations of change candidates determined in s77 (s81).

The change application determination unit 105 selects change candidates related to a next (next higher) train running station, and repeats the processing of s71 to s81 (s83). The change application determination unit 105 ends the change application determination processing s39 after executing the processing of s71 to s83 up to change candidates related to a train running station having the lowest order (that is, for all change candidates from the highest order to the lowest order) among the change candidates extracted at the beginning of the change application determination processing s39.

Change Execution Determination Processing

FIG. 11 is a flowchart illustrating details of the change execution determination processing s77. The change application determination unit 105 determines effects of the selected combination candidate by determining the number of inconsistencies and the increase or decrease in the evaluation value in the predicted timetable, and determines whether an operation plan related to the selected combination candidate is determined as a change candidate.

First, the change application determination unit 105 determines whether either of the following conditions is satisfied: the number of inconsistencies in all the trains in the predicted timetable is decreased due to the changes in operation plan according to the selected combination candidate (the number of inconsistencies in the post-application timetable is decreased compared to the number of inconsistencies in the pre-application timetable), or the number of inconsistencies of all the trains in the predicted timetable is not increased or decreased but the evaluation value of the predicted timetable is improved due to the changes in operation plan according to the selected combination candidate (s91).

The change application determination unit 105 executes processing of s93 when any of the above-mentioned conditions is satisfied (s91: Yes), and executes processing of s95 when none of the above-mentioned conditions is satisfied (s91: No).

In s93, the change application determination unit 105 determines the selected combination candidate as a change candidate, and the change execution determination processing s77 is ended.

In s95, the change application determination unit 105 determines whether a condition that the number of inconsistencies in all the trains in the predicted timetable is increased due to the changes in operation plan according to the application of the selected combination candidate, but the evaluation value of the predicted timetable is improved is satisfied.

The change application determination unit 105 executes processing of s99 when the above-mentioned condition is satisfied (s95: Yes), and executes processing of s97 when the above-mentioned condition is not satisfied (s95: No).

In s97, the change application determination unit 105 determines that the selected combination candidate is not determined as a change candidate (exclude the selected combination candidate from the change candidates), and the change execution determination processing s77 is ended.

In s99, the change application determination unit 105 determines whether the number of inconsistencies in train operation according to the selected combination candidate is increased due to the changes in operation plan according to the selected combination candidate, that is, whether an inconsistency that disturbs the train operation related to the selected combination candidate occurs.

When the number of inconsistencies in the train operation related to the selected combination candidate is increased (s99: Yes), the change application determination unit 105 executes the processing of s97, and when the number of inconsistencies in the train operation related to the selected combination candidate is not increased (s99: No), the change application determination unit 105 executes processing of s101.

In s101, the change application determination unit 105 determines whether the inconsistency increased due to the changes in operation plan according to the selected combination candidate is a resolvable inconsistency. For example, the change application determination unit 105 determines whether the inconsistency is resolved in the past by searching for the allowable inconsistency information in the inconsistency allowable list DB 250. For example, the change application determination unit 105 determines whether the increased inconsistency is an inconsistency that is repeatedly resolved and generated (a predetermined number of times or more) during the repeated processing of s35 to s45 in the processing flow (operation plan change proposal creation processing s3) of the operation plan change proposal creation unit 104.

When the inconsistency increased due to the changes in operation plan according to the selected combination candidate is a resolvable inconsistency (s101: Yes), the change application determination unit 105 executes the processing of s93 and ends the change execution determination processing s77, and when the inconsistency increased due to the changes in operation plan according to the selected combination candidate is an irresolvable inconsistency (s101: No), the change application determination unit 105 executes the processing of s97 and ends the change execution determination processing s77.

As described above, the operation plan change assistance device 100 according to the embodiment uses information about a train operation content before a certain point in time and information about changes in operation plan executed in the past as features; generates an operation plan change determination model in which information about next changes in operation plan to be executed is used as an output value; when a hindrance occurs, inputs a new hindrance such as a hindrance designated by a user or delay information that naturally occurs during rush hours into the operation plan change determination model, and uses output obtained information by above to sequentially input information into the operation plan change determination model, thereby creating a change candidate that is a candidate for each change in operation plan to be executed in stages after the new hindrance; and creates a change candidate that satisfies predetermined conditions among the created change candidates as an operation plan change proposal.

In this way, the operation plan change assistance device 100 according to the embodiment specifies operation plan candidates using the operation plan change determination model that outputs information about whether changes are necessary for the staged changes in operation plan that should be performed in response to the occurred hindrance, and selects a change that satisfies the predetermined conditions from the candidates as the operation plan change proposal. In this way, by modeling the expertise of the changes in operation plan performed in stages by a dispatcher in the past in response to the occurred hindrance, it is possible to perform appropriate changes in operation plan and recover from the hindrance.

As described above, the operation plan change assistance device 100 according to the embodiment can assist creation of an operation plan change proposal that is executed in stages.

The operation plan change determination model can output appropriate changes in operation plan that are executed in stages with high accuracy by using types and number of times of changes in operation plan executed before a certain point in time as input values.

In addition, regarding input to the operation plan change determination model, the operation plan change assistance device 100 sequentially inputs new operation contents (train operation contents in a predicted timetable) created based on the information about the changes in operation plan outputted from the operation plan change determination model into the operation plan change determination model. In this way, by sequentially calculating the train operation contents at each stage from the operation plan change determination model and the predicted timetable, it is possible to appropriately predict changes in train operation plan to be executed.

In addition, the operation plan change assistance device 100 according to the embodiment calculates an evaluation value of an operation plan when a change indicated by each of the change candidates is applied, and specifies the change candidates as change candidates of operation plan change proposals when the calculated evaluation value is an optimal value (when the calculated evaluation value is converged to the optimal value).

Accordingly, it is possible to more reliably discover staged changes in operation plan that can resolve a hindrance or the like.

In addition, the operation plan change assistance device 100 according to the embodiment sets changes that do not depend on a control order related to running between trains, such as a plurality of changes in operation plan to be performed for the same train at the same station or the same change in operation plan for trains having a consecutive departure order at the same station, as changes in operation plan that are executed simultaneously. In this way, by grouping the changes in operation plan of each train, it is possible to efficiently discover staged changes in operation plan that can more effectively resolve a hindrance or the like.

In addition, the operation plan change assistance device 100 according to the embodiment creates a plurality of combinations of change elements in the change candidates, and calculates a fluctuation in evaluation value based on changes for each of the created plurality of combinations, thereby determining a combination of change elements specified as the change candidates. Accordingly, it is possible to specify the most effective combination of change elements even when the change candidate includes a plurality of elements and various patterns of changes in operation plan are present.

In addition, when it is determined that an inconsistency caused by a change indicated by the change candidate will be resolved at a subsequent stage, the operation plan change assistance device 100 according to the embodiment specifies the change candidate as the change candidates of the operation plan change proposals, and when it is determined that the inconsistency cannot be resolved, the operation plan change assistance device 100 according to the embodiment excludes such a change candidate from the change candidates. In this way, for example, when an inconsistency occurs due to a change candidate at a certain stage but the inconsistency is resolved later, the inconsistency is allowable and the change candidate can be adopted, thereby increasing a selection range of change candidates that can be used as operation plan change proposals, and making it easier to specify appropriate operation plan change proposals.

In addition, the operation plan change assistance device 100 according to the embodiment displays each change in the operation plan change proposal on a screen in an order in which the changes are executed in stages. Accordingly, the user can confirm changes in operation plan at each stage to be executed.

In addition, the rail traffic management system 10 according to the embodiment includes the route control device 60 that controls the trains or equipment of the trains based on the created operation plan change proposals. Accordingly, even when a hindrance occurs and the changes in operation plan are performed in stages, it is possible to perform appropriate train operation control and restore operation.

The invention is not limited to the above-mentioned embodiment, and can be implemented using any components without departing from the gist of the invention. The embodiment and modification described above are merely examples, and the invention is not limited thereto as long as the characteristics of the invention are not impaired. Although various embodiments and various modifications have been described above, the invention is not limited thereto and other aspects conceivable within the scope of the technical concept of the invention are also included within the scope of the invention.

For example, some of the functions of each device in the embodiment may be provided in another device, or functions of another device may be provided in the same device.

Furthermore, in the embodiment, constraints, resolution of inconsistencies, and the like have been described as predetermined conditions that the change candidate should satisfy, but other types of constraints may be provided.

Furthermore, in the embodiment, the operation plan change determination model is configured as one trained model, but may be configured as a plurality of trained models. For example, the operation plan change determination model may be provided for each change type of an operation plan, or the operation plan change determination model may be different depending on a stage at which the change is made in the staged changes in operation plan.

REFERENCE SIGNS LIST

10 Rail traffic management system
100 Operation plan change assistance device
103 Determination model generation unit
104 Operation plan change proposal creation unit

The invention claimed is:

1. An operation plan change assistance device comprising:
a processor; and
a memory coupled to the processor,
wherein the processor is configured to execute an operation plan change proposal creation unit, which is configured to:
input information about a train operation content before a designated point in time and information about a change in an operation plan executed before the designated point in time into the operation plan change determination model to output information about a change of operation plan to be executed next after the executed operation plan,
create change candidates that are candidates for each change in an operation plan to be executed in stages a point of time of generating a candidate as an operation plan change proposal by repeating a process of creating information about an operation plan change content based on the information output from the operation plan change determination model one or more times,
specify a change candidate that satisfies a predetermined condition from the created change candidates,
create an operation plan change proposal from the specified change candidate,
calculate an evaluation value of an operation plan when a change indicated by one of the created change candidates is applied,
determine whether the calculated evaluation value is an optimal value, and
specify the change candidate as a change candidate that satisfies the predetermined condition when it is determined that the evaluation value is an optimal value, and
wherein the processor is configured to execute:
an allowable inconsistency storage unit, which is configured to store information about changes in operation plan in which an inconsistency of a train occurs due to a change among changes in operation plan executed in stages in the past, but the inconsistency is resolved by a change at a subsequent stage, and
a change application determination unit, which is configured to:
determine, based on the stored information, whether an inconsistency is resolved at a subsequent stage by a change indicated by the created change candidate,
specify the created change candidate as a change candidate that satisfies the predetermined condition when it is determined that the inconsistency is resolved at a subsequent stage, and
specify the created change candidate as a change candidate that does not satisfy the predetermined condition when it is determined that the inconsistency is not resolved at a subsequent stage.

2. The operation plan change assistance device according to claim 1,
wherein the processor is configured to execute a determination model generation unit, which is configured to set a plurality of changes in operation plan that are not dependent on a control order related to running between trains as changes in operation plan to be executed simultaneously.

3. The operation plan change assistance device according to claim 2,
wherein the determination model generation unit is configured to set a plurality of changes in operation plan to be performed for the same train at the same station or the same change in operation plan for trains whose order of departure at the same station is consecutive as changes in operation plan to be executed simultaneously.

4. The operation plan change assistance device according to claim 1, wherein
the change candidate is a combination of a plurality of change elements constituting a change in operation plan, and
wherein the operation plan change assistance device further includes a change application determination unit, which is configured to create a plurality of combinations of change elements in the change candidate, calculate a fluctuation in evaluation value indicating a change effect for each of the plurality of created combinations, and determine a combination of change elements to be specified as the change candidate among the plurality of combinations based on the calculated fluctuation in evaluation value.

5. The operation plan change assistance device according to claim 1,
wherein the determination model generation unit is configured to generate an operation plan change determination model that receives information about a train operation content before a certain point in time, information about at least one of a type or the number of times of a change in an operation plan executed before the point in time, and information about a train inconsistency occurred at the point in time, and output information about a change in an operation plan to be executed next after the executed operation plan.

6. The operation plan change assistance device according to claim 1,
wherein the operation plan change proposal creation unit is configured to:
input information about a train operation content before a point in time designated by a user and information about a change in operation plan executed before the designated point in time into the operation plan change determination model, and
create the change candidate by further inputting, into the operation plan change determination model, information about a new operation content created based on information about a change in operation plan output from the operation plan change determination model and the information about a change in operation plan output from the operation plan change determination model.

7. The operation plan change assistance device according to claim 1, further comprising:
a display unit configured to display changes in the operation plan change proposal on a screen in an order in which the changes are executed in stages.

8. An operation plan change assistance method to be executed by an information processing device, the method comprising:
executing operation plan change proposal creation processing of inputting information about a train operation content before a designated point in time and information about a change in an operation plan executed before the designated point in time into the operation plan change determination model to output information about a change of operation plan to be executed next after the executed operation plan, creating change candidates that are candidates for each change in an operation plan to be executed in stages after a point of time of generating a candidate as an operation plan change proposal by repeating a process of creating information about an operation plan change content based on the information output from the operation plan change determination model one or more times, specifying a change candidate that satisfies a predetermined condition from the created change candidates, and creating an operation plan change proposal from the specified change candidate;
calculating an evaluation value of an operation plan when a change indicated by one of the created change candidates is applied;
determining whether the calculated evaluation value is an optimal value; and
specifying the change candidate as a change candidate that satisfies the predetermined condition when it is determined that the evaluation value is an optimal value;
executing an allowable inconsistency storage processing of storing information about changes in operation plan in which an inconsistency of a train occurs due to a change among changes in operation plan executed in stages in the past, but the inconsistency is resolved by a change at a subsequent stage; and
a change application determination processing of determining, based on the stored information, whether an inconsistency is resolved at a subsequent stage by a change indicated by the created change candidate, specifying the created change candidate as a change candidate that satisfies the predetermined condition when it is determined that the inconsistency is resolved at a subsequent stage, and specifying the created change candidate as a change candidate that does not satisfy the predetermined condition when it is determined that the inconsistency is not resolved at a subsequent stage.

9. A rail traffic management system comprising:
an operation plan change assistance device including:
a processor; and
a coupled to the processor,
wherein the processor is configured to execute an operation plan change proposal creation unit, which is configured to input information about a train operation content before a designated point in time and information about a change in an operation plan executed before the designated point in time into the operation plan change determination model to output information about a change of operation plan to be executed next after the executed operation plan,
create change candidates that are candidates for each change in an operation plan to be executed in stages after a point of time of generating a candidate as an operation plan change proposal in time by repeating a process of creating information about an operation plan change content based on the information output from the operation plan change determination model one or more times,
specify a change candidate that satisfies a predetermined condition from the created change candidates, and
create an operation plan change proposal from the specified change candidate,
calculate an evaluation value of an operation plan when a change indicated by one of the created change candidates is applied,
determine whether the calculated evaluation value is an optimal value, and
specify the change candidate as a change candidate that satisfies the predetermined condition when it is determined that the evaluation value is an optimal value, and
wherein the processor is configured to execute:
an allowable inconsistency storage unit, which is configured to store information about changes in operation plan in which an inconsistency of a train occurs due to a change among changes in operation plan executed in stages in the past, but the inconsistency is resolved by a change at a subsequent stage, and
a change application determination unit, which is configured to:
determine, based on the stored information, whether an inconsistency is resolved at a subsequent stage by a change indicated by the created change candidate,
specify the created change candidate as a change candidate that satisfies the predetermined condition when it is determined that the inconsistency is resolved at a subsequent stage, and
specify the created change candidate as a change candidate that does not satisfy the predetermined condition when it is determined that the inconsistency is not resolved at a subsequent stage; and
a route control device configured to control a train or equipment of a train based on the created operation plan change proposal.

* * * * *